ately disposed sup-
UNITED STATES PATENT OFFICE.

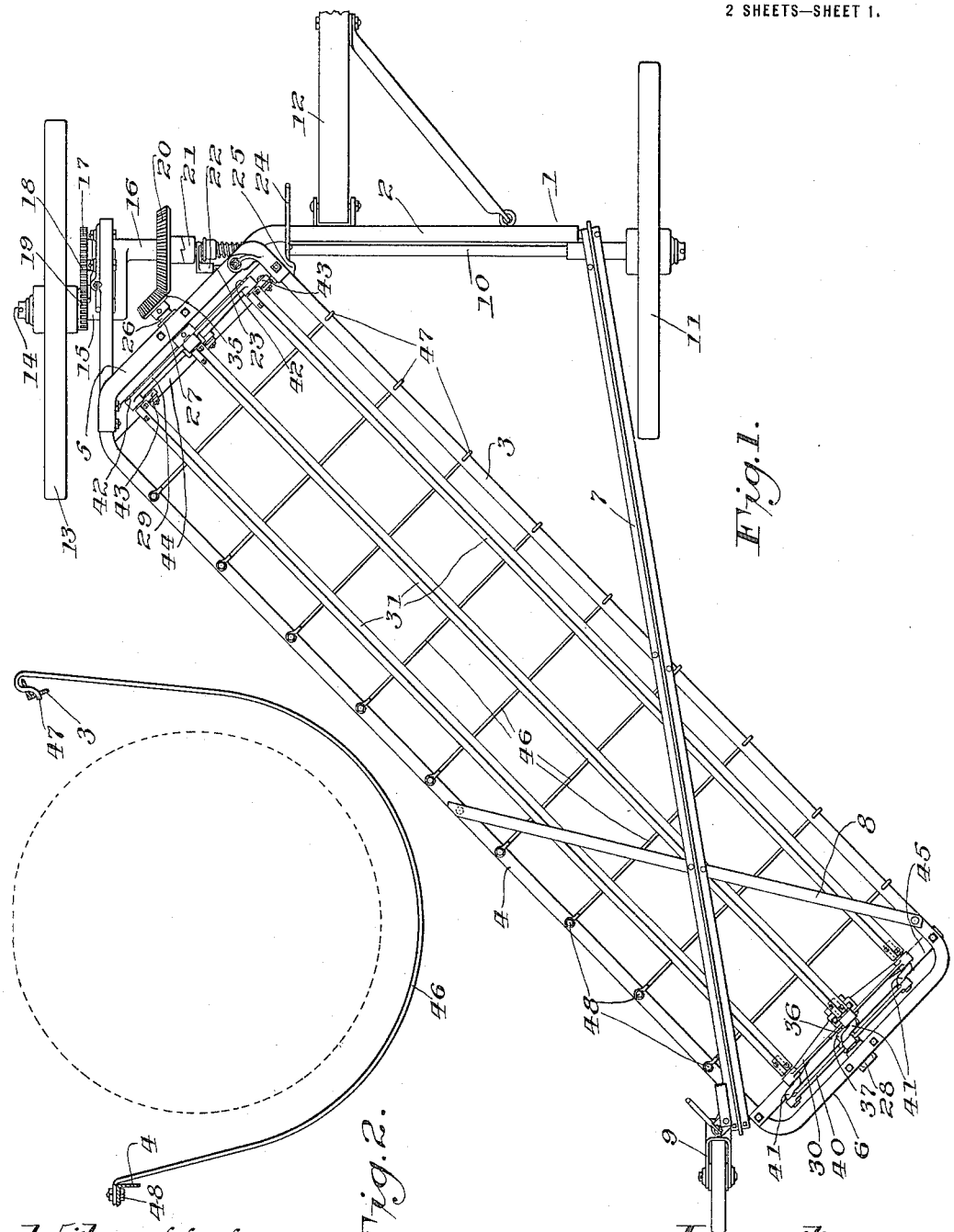

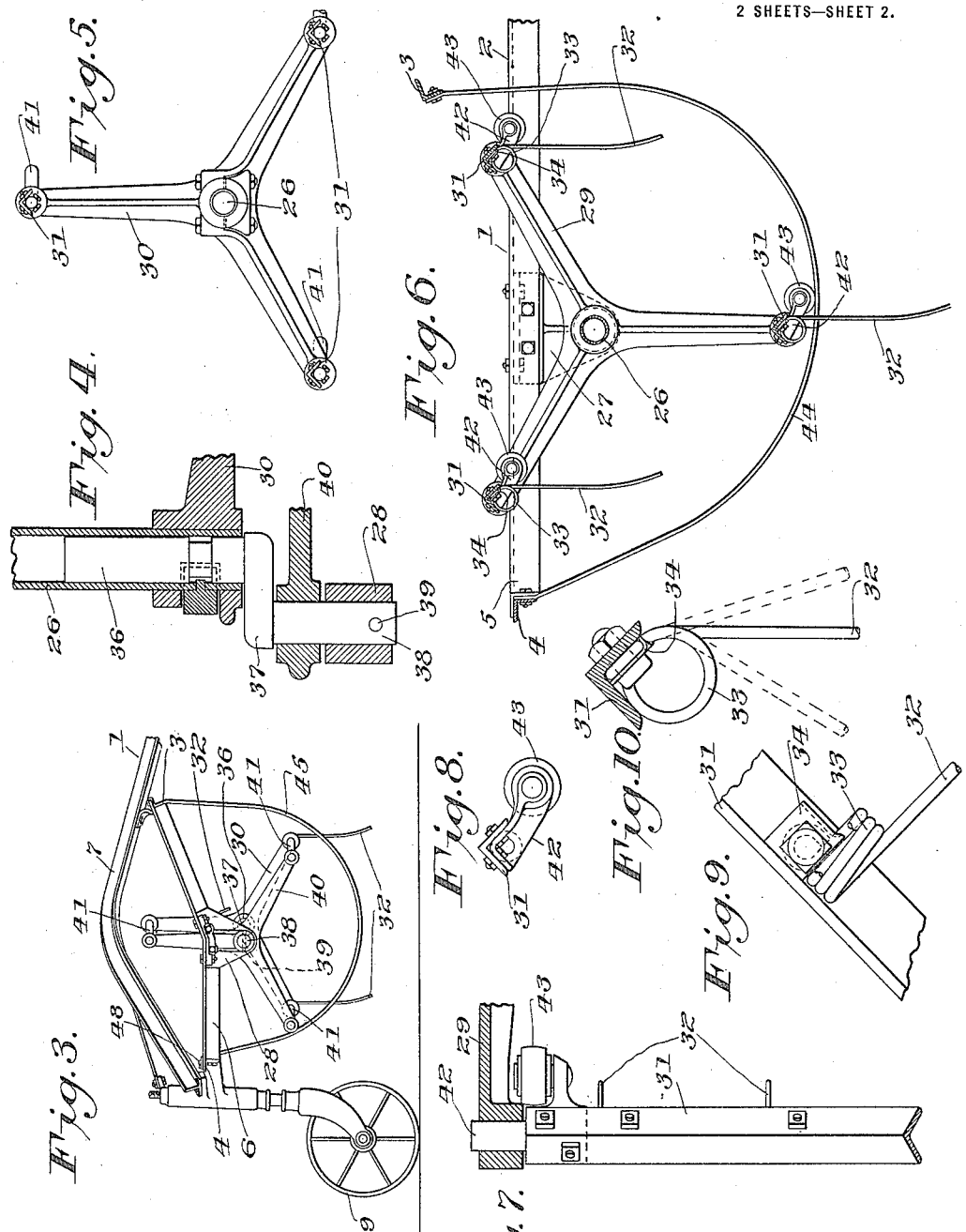

ALBERT GRIEVES, OF SPRINGFIELD, OHIO, ASSIGNOR TO INTERNATIONAL HARVESTER COMPANY OF NEW JERSEY, A CORPORATION OF NEW JERSEY.

SIDE-DELIVERY HAY-RAKE.

1,157,775.

Specification of Letters Patent.

Patented Oct. 26, 1915.

Application filed April 6, 1914. Serial No. 829,837.

*To all whom it may concern:*

Be it known that I, ALBERT GRIEVES, a citizen of the United States, residing at Springfield, in the county of Clark and State of Ohio, have invented certain new and useful Improvements in Side-Delivery Hay-Rakes, of which the following is a full, clear, and exact specification.

My invention relates to side delivery hay rakes of the cylinder type.

The object of my invention is to improve and simplify the construction of such machines in such a manner as to render them more durable and efficient in operation. This object is attained by means of mechanism, one embodiment of which is illustrated in the accompanying drawings, in which—

Figure 1 is a top plan view of a side delivery hay rake having my invention embodied in its construction; Fig. 2 is a detached detail of the rake tooth stripping means; Fig. 3 is an end elevation of the raking cylinder and rake bar controlling means at the delivery end of the rake; Fig. 4 is a detail part of the rake bar controlling means, partly in section; Fig. 5 is a plan view of one of the rake bar controlling spiders; Fig. 6 is an end elevation of the raking cylinder opposite to that of Fig. 3, and including the cam track for supporting the rake bars in a rocking movement; Fig. 7 is a detached detail of one end of one of the rake bars showing the manner of mounting its supporting roller; Fig. 8 is a detail part of Fig. 7; Fig. 9 is a detail showing part of one of the rake bars and the manner of securing the rake teeth thereto; and Fig. 10 is an end elevation of Fig. 9.

Referring to the drawings, wherein the same reference characters designate like parts throughout the several views, 1 represents the wheeled frame of the machine including a front transverse bar 2 having one end inclined rearward and stubbleward relative to the line of travel and secured to a rearwardly extending angularly disposed rectangular rake cylinder supporting frame including front and rear parallel frame bars 3 and 4, respectively, and end members 5 and 6 at the stubbleward and grassward sides of the machine, respectively, the grassward end of the frame being supported by means of the usual arched frame members 7 extending rearward and grassward and from the frame member 2 over the frame members 3 and 4 and secured thereto.

8 represents a transversely disposed supplemental supporting member having its middle portion secured to the member 7 and its opposite ends to the frame bars 3 and 4 of the cylinder supporting frame, and 9 a caster wheel mechanism connected with the rear end of the member 7 and the cylinder supporting frame.

10 represents a driving axle journaled in bearings carried by the wheeled frame and having a traction wheel 11 mounted upon the grassward end thereof, and 12 a draft tongue connected with the frame member 2.

13 represents a traction wheel journaled at the stubbleward side of the wheeled frame upon a stub axle member 14 carried by a vertically swinging frame 15 having a sleeve member 16 that receives the rotatable axle 10, and 17 represents a gear member secured to the axle and meshing with an intermediate gear member 18 carried by the frame 15 and meshing with a gear member 19 operatively connected with the traction wheel 13.

20 represents a beveled gear wheel journaled upon the axle 10 and having clutch teeth upon one end of its hub that may engage with a slidable spring-pressed clutch member 21 mounted upon the axle 10 and rotatable therewith, its position being controlled by a clutch shifting fork 22 secured to one end of a rock shaft 23 journaled parallel with the axle in bearings carried by the wheeled frame and having a crank arm 24 at its opposite end that engages with a cam-shaped wing member 25 secured to the wheeled frame and operative to move the rock shaft longitudinally when moved in one direction to disengage the clutch mechanism, and permit the shaft to move in the opposite direction to allow the clutch members to reëngage when the crank arm is moved in an opposite direction. The rake cylinder includes an axle member 26 journaled in bearing boxes 27 and 28 secured to the end bars 5 and 6, respectively, of the wheeled frame, and having three-arm spider members 29 and 30 secured to the stubbleward and grassward ends thereof, respectively, and 31 represents angular rocking tooth carrying bars having their opposite ends journaled in bearings carried by the opposite ends of the arms of the spider members 29 and 30. The rake bars are preferably made angular in form and each carries a series of rake teeth 32 having a series of coils 33 at one end, and 34 represents clips secured to the bars and having curved lip members that engage with the free ends of the coils in a manner to secure the teeth to the bars, permitting their operative ends to be adjusted angularly in either direction at right angles with the supporting bars, as shown by dotted lines in Fig. 10.

The spiders 29 and 30 rotate with the axle 26, motion being transmittetd to the axle 26 by means of a pinion 35 secured to its stubbleward end and meshing with the beveled gear wheel 20. The axle 26 is preferably tubular and its grassward end carrying the spider 30 is journaled upon an arm 36 forming part of a crank shaft 37 having an arm 38 extending grassward parallel with the arm 36, eccentric thereto and having its end rigidly secured in the bearing box 28 by means of a pin 39 and having a three-arm spider 40 freely journaled thereon. The delivery ends of the rocking tooth carrying bars 31 are provided with crank arms 41 that are journaled in the arms of the spider member 40, and as the raking cylinder rotates the spider 40 rotates with the spider 30, but eccentric thereto, in a manner to cause the tooth carrying bars 31 to rock in a direction to withdraw the rake teeth from the moving hay as they move upward from the ground in a well-known way, a better result being obtained by locating the bar controlling mechanism at the delivery end of the raking cylinder, as there is much less torsional strain upon the cylinder when the controlling means are located adjacent the delivery end where the heaviest duty is performed. Supplemental supporting means for the opposite ends of the rocking tooth carrying bars include arms 42, having one end secured to the bar, and rollers 43 journaled at their opposite ends and running upon a cam-shaped track 44 carried by the frame of the machine, a similar track 45 operating as a shield for the spider 30 at the delivery end of the raking cylinder.

The strippers for the rake teeth include rods 46 having at their front ends double curved hook members 47 that are received by openings in the two webs of the angular frame member 3 of the rake cylinder supporting frame, and extending downward are curved rearward concentric to the axis of the raking cylinder and have their opposite ends provided with eye members whereby they are secured to the frame bar 4 by means of bolts 48.

Having shown and described a preferred embodiment of my invention, I do not wish that it be confined closely to the precise details of the construction as shown, it being understood that many minor changes may be made in the structure without departing from the spirit of the invention.

What I claim as my invention, and desire to secure by Letters Patent, is:

1. In a side delivery hay rake, a wheeled frame, a rotatable raking cylinder angularly disposed relative to the line of draft, a series of rockable tooth carrying bars on said cylinder, means carried by said frame at the delivery end of said cylinder and operative to control the rocking movement of said bars, arms secured to the opposite ends of said bars, and a cam-shaped track carried by said frame and engaging with said arms.

2. In a side delivery hay rake, a wheeled frame, a rotatable raking cylinder, a cylinder supporting frame disposed at an angle to the line of draft forming part of said wheeled frame and including front and rear parallel bars, rockable tooth bars on said cylinder carrying teeth in spaced relation, and a series of toothed strippers having one end provided with a hook member received by openings in one of said parallel frame bars and curved concentric with the axis of said rocking cylinder and partially encircling it and secured at its opposite end to the remaining parallel frame bar.

3. In a side delivery hay rake, a wheeled frame, a rotatable raking cylinder angularly disposed relative to the line of draft, said cylinder including an axle, a series of radially disposed arms secured to opposite ends of said axle, rockable tooth carrying bars journaled upon said arms, said bars having crank arms at their delivery ends, a rotatable member journaled upon the delivery end of said wheeled frame eccentric to the axis of said axle and provided with a series of radially disposed arms having said crank arms journaled therein, arms secured to the opposite ends of said tooth carrying bars, rollers journaled upon said arms, and a cam-shaped track carried by said wheeled frame and upon which said rollers travel.

4. In a side delivery rake, a cylinder frame having a plurality of longitudinally extending members, one of the same being of angle material and having a series of holes in each web thereof, and spaced strippers operatively connected at one end to one of said members and having hooked ends each extending through holes in both webs of said frame member.

In testimony whereof I affix my signature, in the presence of two witnesses.

ALBERT GRIEVES.

Witnesses:
F. C. MILLER,
R. M. HOLLENBECK.

Copies of this patent may be obtained for five cents each, by addressing the "Commissioner of Patents, Washington, D. C."